May 5, 1931.　　　　　G. W. DOOLEY　　　　　1,803,933
HYDRAULIC DRIVING MECHANISM
Filed April 16, 1928　　3 Sheets-Sheet 1
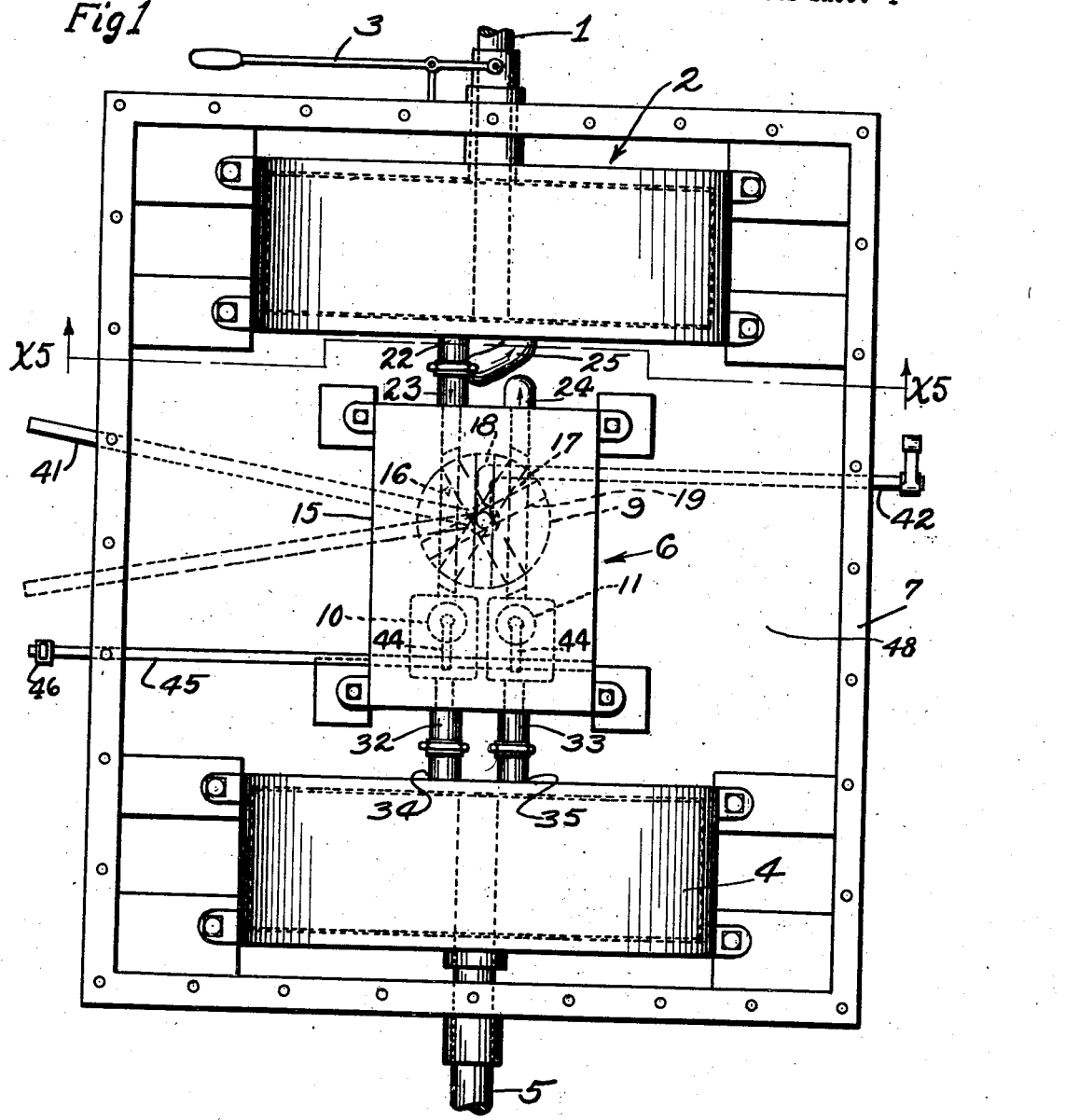
WITNESS
Robt S. Woolsey
INVENTOR
GEORGE W. DOOLEY
by James R. Townsend
his atty May 5, 1931.  G. W. DOOLEY  1,803,933
HYDRAULIC DRIVING MECHANISM
Filed April 16, 1928   3 Sheets-Sheet 2
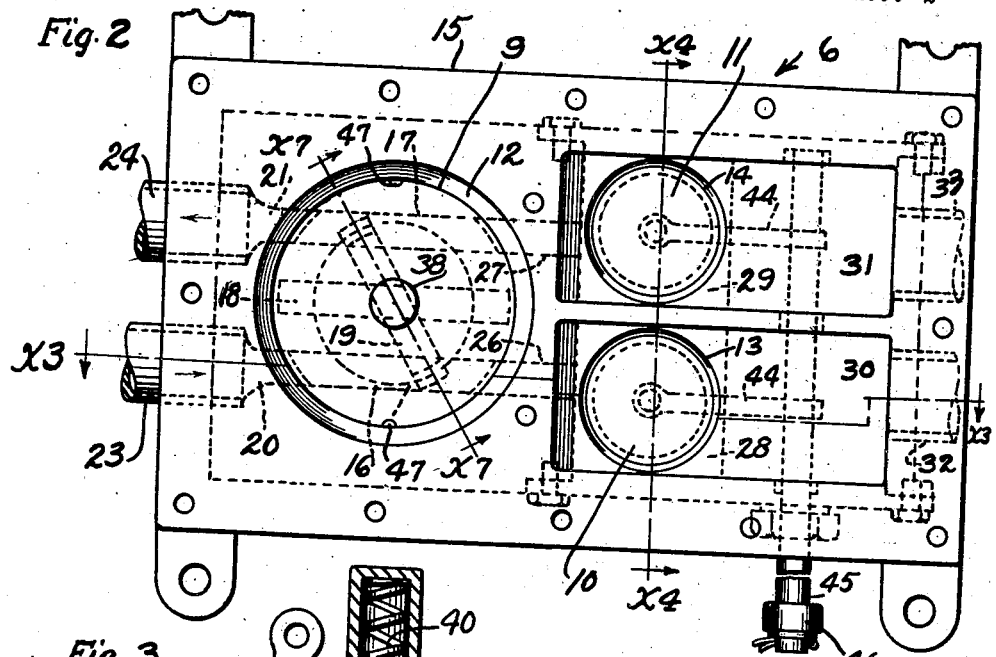
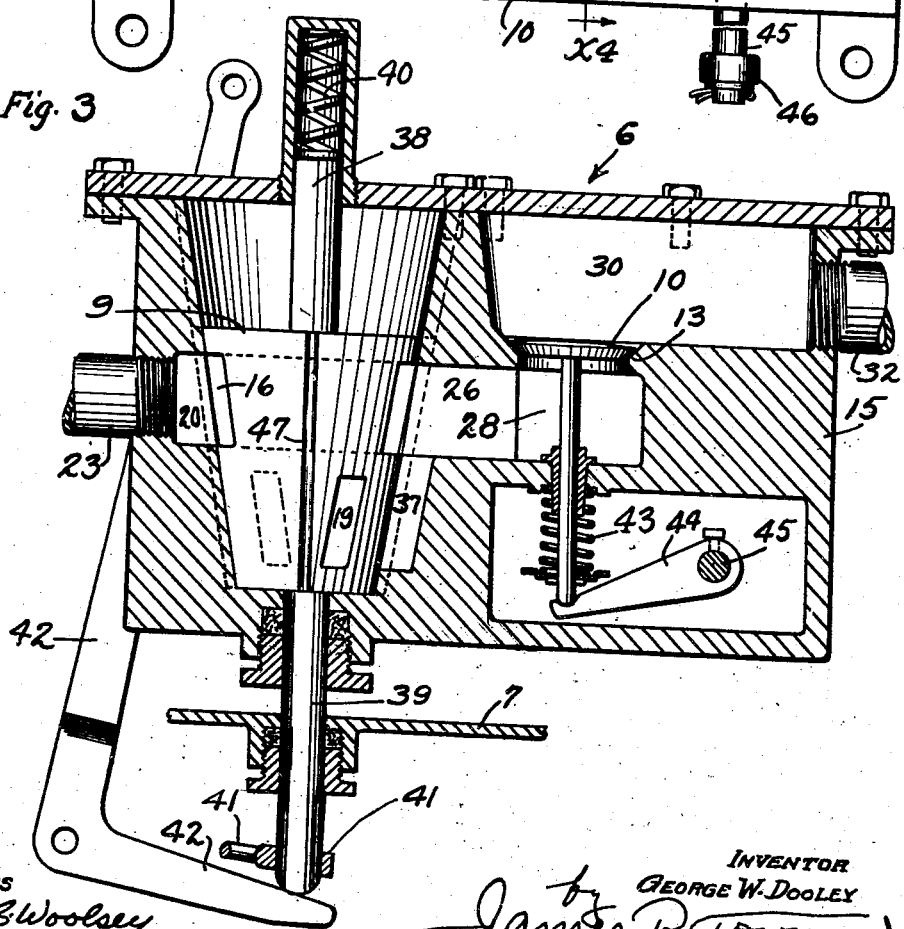
WITNESS
Robt S Woolsey
INVENTOR
GEORGE W. DOOLEY
by James R. Townsend
his atty May 5, 1931. G. W. DOOLEY 1,803,933
HYDRAULIC DRIVING MECHANISM
Filed April 16, 1928 3 Sheets-Sheet 3

WITNESS
Robt S. Woolsey

INVENTOR
GEORGE W. DOOLEY
James R. Townsend

Patented May 5, 1931

1,803,933

UNITED STATES PATENT OFFICE

GEORGE W. DOOLEY, OF DUCOR, CALIFORNIA

HYDRAULIC DRIVING MECHANISM

Application filed April 16, 1928. Serial No. 270,512.

This invention relates to power plants in which power driven liquid pumps operate to drive motors and more particularly relates to means for controlling the movement and flow direction of the driving medium between the pump and motor.

The invention is especially devised for use in automobiles where it is desirable to have maximum flexibility in the transmission of energy from a constantly running engine or prime mover to the traction wheels or load.

An object of my invention is to provide a hydraulic braking device in connection with a hydraulic driving mechanism which affords maximum flexibility in energy transmission.

Another object is to provide a controlling means for hydraulic transmissions, which is operated in a manner involving minimum change from the operations of standard gear shift driving mechanisms.

A feature of the invention is an arrangement of valves which operates to reverse the flow direction to effect either forward or backward movement of the driven vehicle, and to act with a desirable braking effect when the momentum of the vehicle is driving the motor.

An advantage lies in the ease and quickness of speed changes and in the simplicity of reversing and braking.

It is understood that the prime mover or engine may be controlled as by a throttle, not necessary to be shown in the drawings.

Other objects, advantages and features of invention may appear from the accompanying drawings, the subjoined detailed description and the appended claims.

The accompanying drawings illustrate the invention.

Figure 1 is a plan view of a power plant showing a pump and motor as related by a control constructed in accordance with my invention.

Fig. 2 is an enlarged plan view of my control with its cover plate removed showing the reversing and braking valves.

Fig. 3 is a longitudinal sectional elevation on line $x3$, Fig. 2, showing the reverse and brake valves and their actuating means.

Figure 4:
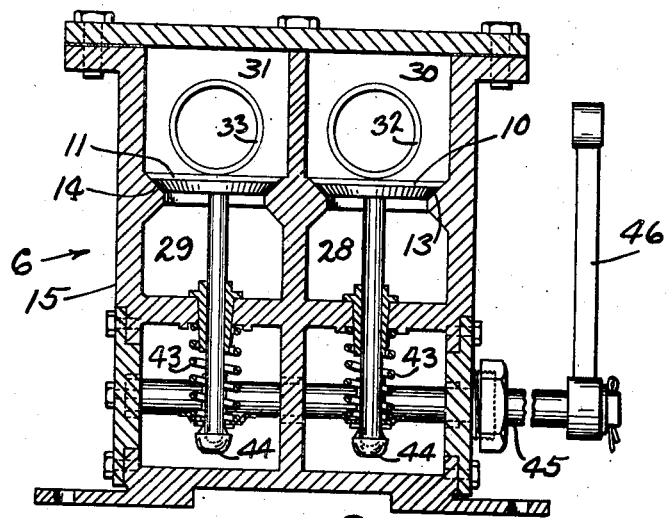
Fig. 4 is a transverse sectional view on line $x4$, Fig. 2, showing the brake valves and actuating means.
Figure 5:
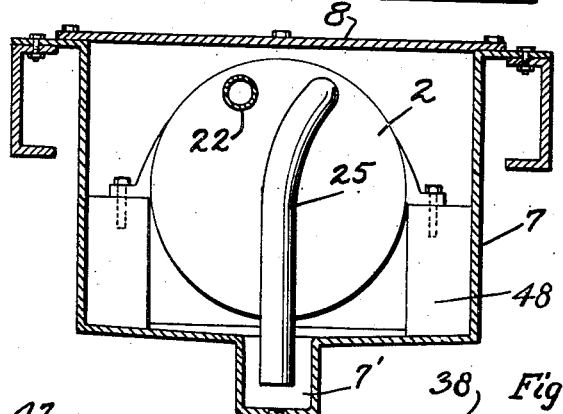
Fig. 5 is a transverse section, on a reduced scale, on line $x5$, Fig. 1, showing the intake for the pump and its relation to the transmission case.
Figure 6:
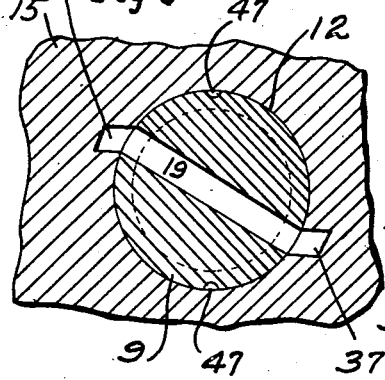
Fig. 6 is a sectional plan view of the reversing valve, on line $x6$, Fig. 7.

1 designates the shaft of a prime mover, such as an internal combustion engine as now commonly employed in automobiles. As shown, the shaft is directly connected with the pump 2, but I in no sense wish to be understood as limiting myself to this form, as the prime mover and pump may be distantly separated and coupled as is the conventional engine and transmission.

It is understood the prime mover is controllable as by a throttle, not shown.

In the drawing the pump is shown as of the rotary type and by preference is the pump shown in a co-pending application filed by by me on June 14, 1927, bearing Serial Number 198,874, now patent number 1,797,905, dated March 24, 1931, in which a rotor having vanes is bodily movable relative to the stator or pump case for varying the delivery to the motor, of oil or other transmitting fluid for the operation of the fluid motor.

In the present application the lever 3 may be operated to vary the capacity of the pump, as described in the recited application.

The motor 4, referred to, may be of any form of fluid operated pump, but by preference is of substantially indentical construction with the pump, except that it has no means for verying its capacity. Extending from the motor is a shaft 5 which represents "load" and in an automobile may correspond to the drive shaft extending between the transmission and differential.

The speed controlling reversing and braking mechanism 6 of my invention is disposed between the pump and motor and is housed therewith in a casing 7, provided with a removable cap plate 8, for convenient access.

As shown, the oscillatory speed controlling braking and reversing valve 9 is of the conical plug type and the braking valves 10 and 11 are of the poppet type and by preference and for economy in structure and ease of installation the seats 12, 13 and 14, for the valves 9, 10 and 11, respectively, are formed en bloc, or in a unitary casing 15, and are to an extent operable simultaneously by a common brake pedal, not shown.

Figure 7:
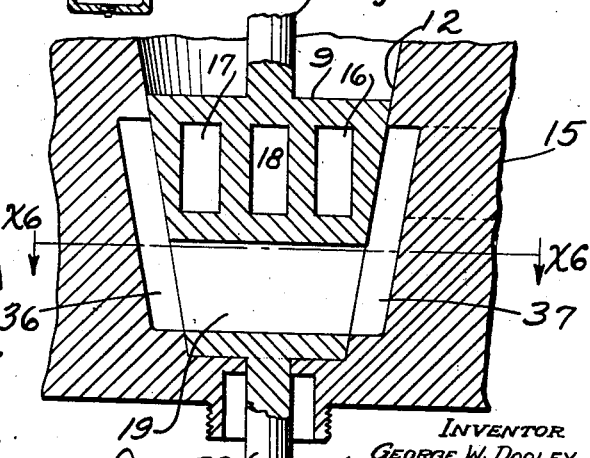
Fig. 7 is a fragmental vertical section of the reversing valve on line $x7$, Fig. 2.

The reverse valve 9 has adjacent its upper end, as disposed in Figs. 3 and 7, three relatively parallel transversely extending fluid directing ports 16, 17 and 18, all occupying the same plane; and in a plane adjacent the lower end of said reversing valve there is a relief port 19 which extends transversely through the valve body at an angle to the trend of the fluid directing ports 16, 17 and 18.

Formed in the casing 15 there is an intake port 20 and an outlet port 21; the intake 20 being in direct communication with the delivery port 22 of the pump by means of a delivery pipe 23; and the outlet port by means of a pipe 24 being indirectly connected with the suction intake 25 of the pump through the housing 7 and sump 7', from which sump the intake pipe 25 leads. Leading through the valve seat 12 directly opposite and alined with the intake 20 and outlet 21 are the passages 26 and 27 which respectively communicate with cavities 28 and 29 formed in the casing. In the casing and in planes above the cavities 28 and 29 are valve chambers 30 and 31 which are in controlled communication with the cavities 28 and 29 by means of the recited brake, or poppet valves 10 and 11. Pipes 32 and 33 form communications respectively with the intake 34 and exhaust 35 of the motor 4.

In the face of the reverse valve seat 12, in constant communication with the outlet 21 and passage 26 respectively, are the vertically extending passes 36 and 37 which function with the valve port 19 in the reversing and braking operation.

The reverse valve carries upper and lower guide and lifting and turning stems 38 and 39 respectively, the stem 38 being acted upon by a spring 40 for normally holding the valve to seated position and the stem 39 provided with a lever 41 for turning the valve, and the stem 39 also being acted upon by a lever 42 for the raising of the valve to neutral or non-acting position.

The poppet valves 10 and 11 are normally held to seated positions by springs 43 and are acted upon by cams 44 on a shaft 45, having an operating lever 46, which, together with lever 42 may be simultaneously controlled by a brake pedal, not shown.

Formed in the face of the reverse valve is a channel 47 which provides leakage to prevent fluid trapping confinement beneath the valve which might interfere with the valve seating.

The vertical reciprocable oscillatory conical valve 9 as is here shown, is used to control and to direct the flow of fluid between driving and driven mechanisms.

Assuming for example that an automotive vehicle is equipped with hydraulic driving mechanism such as a power driven supply pump 2 and a hydraulic motor 4 in driving connection with the driving wheels of the vehicle:

In normal non-traveling position the pump vane shifting lever 3 is in neutral position. When in this position the vanes of the pump are closed, making it impossible for driving fluid to enter the pump, and when in this position the rotor of the pump acts merely as a fly wheel and revolves at the idling speed of the engine.

To start the vehicle it is only necessary to cause lever 46 to hold open both valves 10 and 11 and to move the vane shifter, lever 3, to a position corresponding with low in the present-day gear shift car so that the pump will impell the liquid slowly. This position allows a limited quantity of the power transmitting oil to be sucked from the sump into the rotary pump from which it is expelled and is forced through the outlet 22, and through the pipe 23, leading to the valve 9 which has therethrough the parallel valveways 16, 17 and 18 cored through the body of said valve 9. For straight-away driving the way 16 is in alinement with the outlet 22 of the pump, and the way 17 is alined with the motor outlet. As the fluid passes through the valve 9 it is discharged into a cavity 28 that is provided in the valve assembly block 6, and that has a single outlet 13 the area of which can be varied by means of the poppet valve 10, which is so placed in respect to the cavity that the inflowing fluid will lift the valve from its seat 13 if it should be closed, but as the valve is normally held open by the operating lever 46, the fluid readily passes through the port and is conducted to the driving fluid motor 4 of the vehicle. The motor is a duplicate of the rotary pump except that its vanes are not variable. Thus the motor receives all of the pressure fluid delivered to it and the pressure of the fluid is changed to mechanical power by driving the rotor of the motor, which, as has herein before been stated, is in direct mechanical connection with the wheels of the vehicle.

From the motor the fluid is discharged back into the valve assembly block 6 and into a cavity 31 above a poppet valve 11 similar to the aforementioned valve 10, which is also mechanically lifted from its seat 14, thus permitting the fluid to pass through the valve and in turn to pass through the fluid directing port or passage 17 in the valve core 9 and then out of the valve assembly block and to be discharged into a reservoir 48 which surrounds and forms a base for all of the aforementioned elements.

A sump 7' is provided in the reservoir and from this sump the fluid is lifted through the suction inlet 25 to the pump to again go through the above described cycle of operation.

To reverse the vehicle it is only necessary to shift the reversing lever 41 through its length of travel, thus causing the passages 16 and 17, described for conducting fluid through the valve core for straight-away travel, to be shifted from alinement with the inlet and outlet ports 20, 21 and 26, 27 and to bring another set of ports 18 and 19 into alinement with said inlet and outlet ports 20, 21 and 26, 27.

The passages under present consideration are so arranged that they conduct the fluid to opposite sides of the valve assembly block so that the erstwhile exhaust, fluid, poppet valve becomes the pressure, fluid valve. From this reversal of fluid flow it will be seen that the driving motor will have its direction of rotation reversed, thus causing a reversal of vehicle travel.

To effect hydraulic braking for the vehicle it is only necessary to press down on the brake pedal, not shown, to partially rotate shaft 45, thus allowing the poppet valves 10 and 11 to move toward their respective seats 13 and 14 and additionally to lift the valve core 9 from its seat in the valve assembly block, thus permitting free circulation of fluid around said valve 9.

The foregoing operation, as to the valves, restricts the orifice through which the exhaust fluid must travel, yet it does not retard the inflow of fluid to the motor. Since the inflow of fluid is not diminished, it will be readily observed that the incoming fluid must be discharged, and since the discharge orifice is limited, the total volume of fluid is discharged at a high velocity, through the restricted poppet valve orifice. Thus the momentum of the moving vehicle is absorbed into work by ejecting the fluid through a restricted orifice.

The ejected fluid can circulate around the valve core body 9 and again enter the motor by reason of suction and, as is likely, some of it will be discharged into the reservoir, but as the engine is idling along it will pump enough fluid to the valve core and suction inlet of the motor to make up for loss to the reservoir 48.

In case the vehicle is moving freely, as in coasting down a hill with the engine stopped, it will be apparent that the driving fluid motor, which is now being driven by the freely moving vehicle, will draw fluid from the reservoir by suction through the discharge conduit 24 into the space created when the valve core 9 is lifted from its seat 12. Thus it will readily be seen that the motor when used as a hydraulic brake is assured of an ample supply of fluid even when the prime mover is dead and is not supplying fluid to the motor.

I claim:

1. The combination with a pump and a motor, of a casing provided with a sump, a reversing valve seat, two poppet valve seats, a passage connecting the pump outlet with the reversing valve seat; a passage connecting the reversing valve seat with the motor through one of the poppet valve seats; a poppet valve to prevent return of fluid from the motor through such poppet valve seat; there being an indirect passage leading from the motor to the sump through the reversing valve seat; a poppet valve in the second poppet valve seat to pass fluid to the sump, means for closing the poppet valves; means to open the poppet valves, respectively, and a reversing valve in the reversing valve seat to pass the fluid alternately at the will of the operator to the motor through one or the other of said poppet valves.

2. The combination with a pump and a motor, of a casing provided with a sump, a reversing valve seat, two poppet valve seats, a passage connecting the pump outlet with the reversing valve seat; a passage connecting the reversing valve seat with the motor through one of the poppet valve seats; a poppet valve to prevent return of fluid from the motor through such poppet valve seat; there being an indirect passage leading from the motor to the sump through the reversing valve seat; a poppet valve in the second poppet valve seat to pass fluid to the sump, and a reversing valve in the reversing valve seat to pass the fluid alternately at the will of the operator to the motor through one or the other of said poppet valves, and means to simultaneously open both poppet valves.

3. The combination with a pump and a motor, of a casing provided with a sump, a reversing valve seat, two poppet valve seats, a passage connecting the pump outlet with the reversing valve seat; a passage connecting the reversing valve seat with the motor through one of the poppet valve seats; a poppet valve to prevent return of fluid from the motor through such poppet valve seat; there being an indirect passage leading from the motor to the sump through the reversing valve seat; a poppet valve in the second poppet valve seat to pass fluid to the sump, and a reversing valve in the reversing valve seat to direct the fluid alternately at the will of the operator to the motor through one or the other of said poppet valves, and means to simultaneously open both poppet valves; said reversing valve being vertically movable in its valve seat and means to vertically adjust the poppet valves to allow flow around the reversing valve for braking effect.

In testimony whereof, I have hereunto set my hand at Los Angeles, California, this 9th day of March, 1928.

GEORGE W. DOOLEY.